United States Statutory Invention Registration [19]

[11] Reg. Number: H460

Werner [43] Published: Apr. 5, 1988

[54] DECONTAMINATION SYSTEM

[75] Inventor: James L. Werner, Barrington, Ill.

[73] Assignee: Brand Insulations, Inc., Park Ridge, Ill.

[21] Appl. No.: 100,450

[22] Filed: Sep. 24, 1987

[51] Int. Cl.[4] ..... B01D 50/00

[52] U.S. Cl. ..... 55/385 A; 55/97; 55/467; 98/33.1; 160/332; 160/DIG. 8; 312/1; 312/3

*Primary Examiner*—John F. Terapane
*Assistant Examiner*—Susan Wolffe
*Attorney, Agent, or Firm*—Dressler, Goldsmith, Shore, Sutker & Milnamow, Ltd.

[57] ABSTRACT

A decontamination system in combination with a work space maintained at subambient pressure. An inner vestibule is connected to the work space via a first portal, which can be selectively opened and closed by a first door. A middle vestibule, in which at least one shower bath is installed, is connected to the inner vestibule only via a second portal, which can be selectively closed by a second door or opened. An outer vestibule is connected to the middle vestibule only via a third portal, which can be selectively opened and closed by a third door, and to an ambient space only via a fourth portal, which can be selectively opened or closed by a fourth door. Each door is a rigid door. Except for the third door, which seals the third portal when the third portal is closed by the third door, each door has fixed louvers allowing small quantities of air to infiltrate. The third door is interconnected with the second door in such a manner, as by means of a chain of fixed length, that the second and third portals cannot be simultaneously opened. Personnel can leave their tools and garments in the inner vestibule, use the shower bath in the middle vestibule, and put on clean garments in the outer vestibule, from which they can pass to the ambient space, with minimal risk of escape of fugitive particles via the decontamination system.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

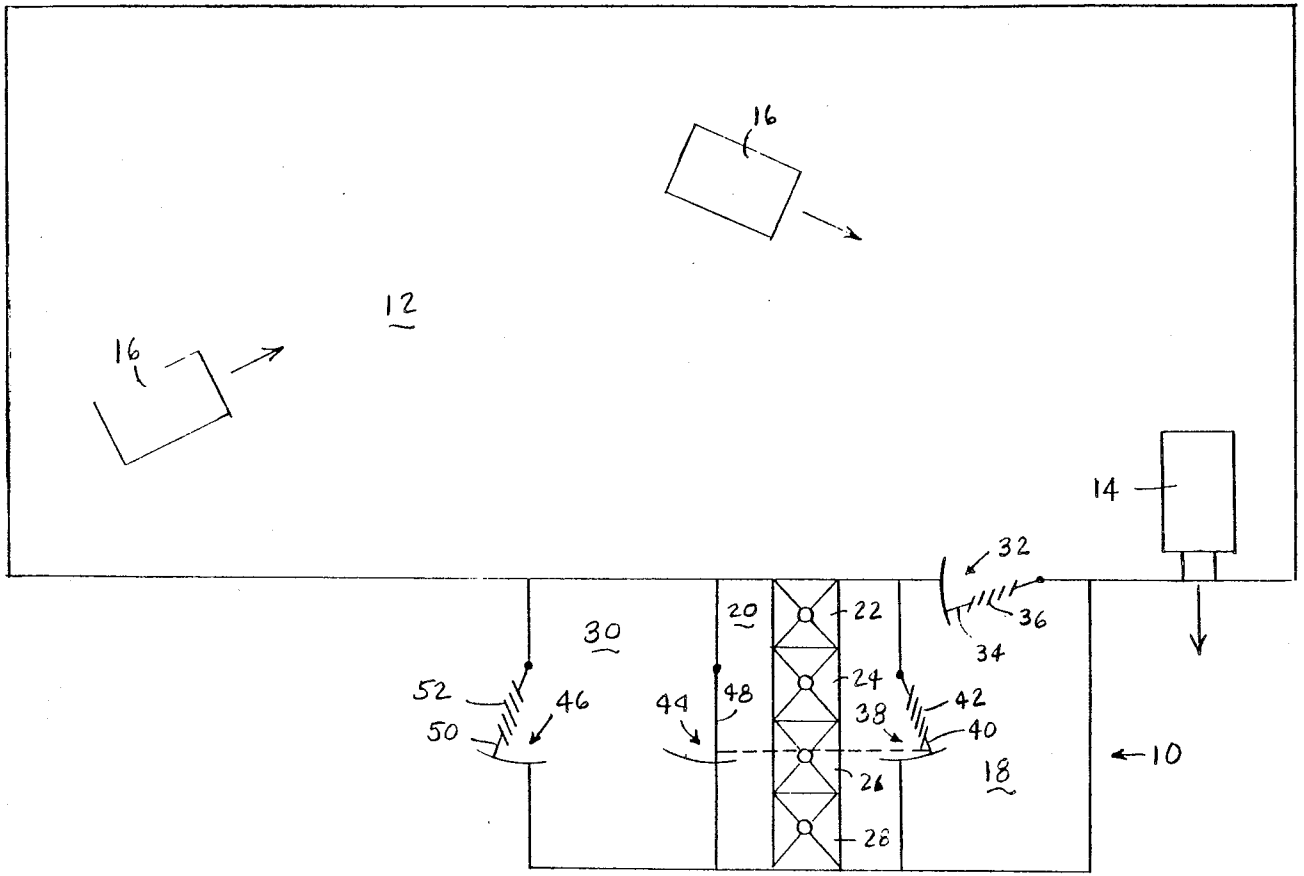
10
14
32
36
34
18
42
40
22
24
38
26
16
20
48
44
30
46
52
50
12
16

DECONTAMINATION SYSTEM

BACKGROUND OF THE INVENTION

This invention pertains generally to a decontamination system for use by personnel working in a work space contaminated with airborne particles, such as asbestos particles, and particularly to such a decontamination system in combination with such a work space.

For many years, asbestos insulation was used widely for its insulating and fireproofing properties. However, recent findings of health hazards associated with airborne particles, particularly asbestos particles, have led to concerted efforts to remove asbestos insulation from public buildings and other structures. An important industry has been developed to deal with asbestos abatement.

Because of health hazards associated with asbestos particles, great care must be taken to protect personnel working in asbestos abatement and to avoid escape of fugitive particles from the work space. The U.S. Environmental Protection Agency, the U.S. Occupational Safety and Health Administration, and other regulatory authorities and standard-setting agencies have developed detailed guidelines dealing with asbestos abatement.

Personnel working in asbestos abatement require a decontamination system, in which they can change their garments and leave their tools. An example of such a system is disclosed in U.S. Pat. No. 4,604,111.

SUMMARY OF THE INVENTION

It is a principal object of this invention to provide a decontamination system of an improved type, in combination with a work space, which is isolated by the decontamination system from an ambient space, and which may be contaminated with airborn particles, such as asbestos particles. The work space is maintained at subambient pressure, e.g., 0.02 to 0.04 inches of water below ambient pressure, as by means of an air exhaust system equipped with an air filtering device.

In accordance with this invention, the decontamination system comprises an inner vestibule, a middle vestibule, and an outer vestibule. Herein, each reference to a work space or to a vestibule is intended to refer not only to an enclosed space but also to its enclosing walls.

The inner vestibule is connected to the work space via and preferably only via a first portal. The decontamination system comprises a first door, preferably a rigid door, which is mounted between the inner vestibule and the work space so as to enable the first portal to be selectively opened and closed by the first door. The first door is adapted, as by means of fixed louvers, to allow small amounts of air to infiltrate from the inner vestibule, through the first door, and into the work space when the first portal is closed by the first door.

The middle vestibule is connected to the inner vestibule via and preferably only via a second portal. The decontamination system comprises a second door, preferably a rigid door, which is mounted between the middle vestibule and the inner vestibule so as to enable the second portal to be selectively opened and closed by the second door. The second door is adapted, as by means of fixed louvers, to allow small amounts of air to infiltrate from the middle vestibule, through the second door, and into the inner vestibule when the second portal is closed by the second door. The decontamination system comprises at least one shower bath installed in the middle vestibule for use by personnel entering the middle vestibule from the inner vestibule.

The outer vestibule is connected to the middle vestibule via and preferably only via a third portal and is connected to the ambient space via and preferably only via a fourth portal. The decontamination system comprises a third door, preferably a rigid door, which is mounted between the outer vestibule and the middle vestibule so as to enable the third portal to be selectively opened or closed by the third door. The third door is interconnected with the second door in such a manner that the second and third portals cannot be simultaneously opened. The third door is adapted to seal the third portal against infiltration of air when the third portal is closed by the third door. The decontamination system comprises a fourth door, preferably a rigid door, which is mounted between the ambient space and the outer vestibule so as to enable the fourth portal to be selectively opened and closed by the fourth door. The fourth door is adapted, as by means of fixed louvers, to allow small amounts of air to infiltrate from the ambient space, through the fourth door, and into the outer vestibule when the fourth portal is closed by the fourth door.

Personnel whose tools, bodies, and garments are contaminated can pass from the work space, through the first portal, and into the inner vestibule, in which they can leave their tools and their garments. They can pass from the inner vestibule, through the second portal, and into the middle vestibule, in which they can use the shower bath. They can pass from the middle vestibule, through the third portal, and into the outer vestibule, in which they can put on clean garments. They can pass from the outer vestibule, through the fourth portal, and into the ambient space. Personnel seeking to enter the work space can pass oppositely through the decontamination system. Personnel can pass through the decontamination system with minimal risk of escape of fugitive particles from the decontamination system.

These and other objects, features, and advantages of this invention will be better understood from the following description of a preferred embodiment of this invention, with reference to the accompanying drawing.

BRIEF DESCRIPTION OF THE DRAWING

The drawing is a floor plan of a work space and a decontamination system, as combined in a preferred embodiment of this invention.

DETAILED DESCRIPTION OF PREFERRED EMBODIMENT

As shown in the drawings, a decontamination system 10 is combined with a work space 12, in such a manner as to constitute a preferred embodiment of this invention.

The work space 12, which is isolated by the decontamination system from the work space 12, and which may be contaminated with airborne particles, such as asbestos particles, is maintained at subambient pressure, e.g., 0.02 to 0.04 inches of water below ambient pressure, by means of an air exhaust system including an air filtering device 14, which may include a HEPA filter. ("HEPA" is an acronym for "High Efficiency Particulate Air".) The work space 12 may have a number of free-standing air filtering devices 16, two being shown, each of which also may include a HEPA filter, so as to filter fugitive particles from the air within the work space 12. Each such device 16 may be placed so as to direct filtered air at personnel working in the work space 12. Use of an air exhaust system equipped with an air filtering device has been known per se in asbestos abatement.

The work space 12 may have impermeable barriers (not shown), e.g., plastic sheeting, at all inlets and outlets other than a first portal noted below and on all decorative or other surfaces that cannot be easily decontaminated. Widespread use of plastic sheeting, however, is not necessary.

Broadly, the decontamination system comprises an inner vestibule 18, which may be also called a "dirty" room, a middle vestibule 20, in which four shower baths are installed, as indicated diagrammatically at 22, 24, 26, and 28 respectively, and which may be also called a "shower" room, and an outer vestibule 30, which may be also called a "clean" room. The inner vestibule 18, the middle vestibule 20, and the outer vestibule 30 are sealed, except as noted below.

The inner vestibule 18 is connected to the work space 12 only via a first portal 32. The decontamination system 10 comprises a first door 34, which is a rigid door, and which is mounted between the inner vestibule 18 and the work space 12 so as to enable the first portal 32 to be selectively opened and closed by the first door 34. The first door 34 is provided with fixed louvers 36, as shown diagrammatically, which allow small amounts of air to infiltrate from the inner vestibule 18, through the first door 34, and into the work space 12 when the first portal 32 is closed by the first door 34.

The middle vestibule 20 is connected to the inner vestibule 18 only via a second portal 38. The decontamination system 10 comprises a second door 40, which is a rigid door, and which is mounted between the middle vestibule 20 and the inner vestibule 18 so as to enable the second portal 38 to be selectively opened and closed by the second door 40. The second door 40 is provided with fixed louvers 42, as shown diagrammatically, which allow small amounts of air to infiltrate from the middle vestibule 20, through the second door 40, and into the inner vestibule 18 when the second portal 38 is closed by the second door 40.

The outer vestibule 30 is connected to the middle vestibule 20 only via a third portal 44 and is connected to the ambient space only via a fourth portal 46. The decontamination system 10 comprises a third door, which is a rigid door, and which is mounted between the outer vestibule 30 and the middle vestibule 20 so as to enable the third portal 44 to be selectively opened and closed by the third door 48. The third door 48 is interconnected with the second door 40 in such a manner that the second portal 38 and the third portal 44 cannot be simultaneously opened. The third door 48 is adapted by means of peripheral gaskets (not shown) or otherwise to seal the third portal 44 against infiltration of air when the third portal 44 is closed by the third door 48. The decontamination system 10 comprises a fourth door 50, which is a rigid door, and which is mounted between the ambient space and the outer vestibule 30 so as to enable the fourth portal 46 to be selectively opened and closed by the fourth door 50. The fourth door 50 is provided with fixed louvers 52, as shown diagrammatically, which allow small amounts of air to infiltrate from the ambient space, through the fourth door 50, and into the outer vestibule 30 when the fourth portal 46 is closed by the fourth door 50.

As shown diagrammatically, a chain 54 of fixed length is used to interconnect the third door 48 with the second door 40. The chain 54 may be so connected as to enable someone easily to disconnect the chain 54 in an emergency. Desirably, an alarm (not shown) will sound if the chain 54 is disconnected. In alternative embodiments (not shown) a cable of fixed length, a rod of fixed length, or springs, spring loaded hinges or other door closing devices to interlock or to assure normally closed positions of the second and third doors, or electromechanical means interlocking the third door 48 with the second door 40 so as to provide a similar function may be so used.

Although the doors noted above are shown diagrammatically to be hinged and to be openable unidirectionally, sliding, rolling, or swinging doors may be alternatively used.

Personnel whose tools, and garments are contaminated can pass from the work space 12, through the first portal 32, and into the inner vestibule 18, in which they can leave their tools and garments. They can pass from the inner vestibule 18, through the second portal 40, and into the middle vestibule 20, in which they can use the shower baths 22, 24, 26, and 28. They can pass from the middle vestibule 20, through the third portal 44, and into the outer vestibule 30, in which they can put on clean garments. They can pass from the outer vestibule 30, through the fourth portal 46, and into the ambient space. Personnel seeking to enter the work space 12 can pass oppositely through the decontamination chamber 10.

When the third portal 44 is opened, a limited amount of air tends to flow from the outer vestibule 30 into the middle vestibule 20, from the middle vestibule 20 into the inner vestibule 18, and from the inner vestibule 18 into the work space 12, from which air is exhausted by the air exhaust system through the air filtering device 14. Thus, personnel can pass through the decontamination system 10 with minimal risk of escape of fugitive particles from the decontamination system 10.

HEPA filters (not shown) which allow air to flow as described in the preceding paragraph, but which do not allow fugitive particles to pass oppositely may be installed in the third door 38, or in its adjacent wall between vestibule 20 and vestibule 30 or may be used in place of one or more of the louvers 36, 42, and 46 or in suitable apertures (not shown) in the adjacent walls which respectively divide the inner vestibule 18 from the work space 12, the middle vestibule 20 from the inner vestibule 18, and the outer vestibule 30 from the ambient space. Exfiltration of fugitive particles would be thus minimized, even if the air exhaust system including the air filtering device 14 were to fail.

The inner vestibule 18 may be also equipped with toilet facilities (not shown) and with tool and garment storage and cleaning facilities (not shown). The middle vestibule 20 may be so arranged that personnel cannot bypass the shower baths 22, 24, 26, and 28. The outer vestibule 30 may be also equipped with garment lockers (not shown) and other conveniences for personnel using the decontamination system 10. As desired or needed, other additions may be also made to the decontamination system 10.

The decontamination system 10 operates in a way that is vastly different from what has been in widespread use in the asbestos abatement industry. The decontamination system 10 alleviates serious concerns over any approach that indiscriminately calls for removal of large amounts of anything, even air, from a contaminated work space. HEPA filter failure, machine cabinet leakage, filter seal leakage, and exhaust duct break through a venturi effect, among other possibilities, can provide escape routes for fugitive airborne asbestos to the outside world. Since the removal of each unit volume from such a work space is a potential asbestos contaminant vehicle, it makes good sense to minimize such flow rather than maximize it, at least from a contingency standpoint.

The decontamination system 10 does not establish flow paths, except as described above, provide flap seals, require air exhaust periodicity, or even necessarily call for widespread use of plastic sheeting. The basic strategy embodied in the decontamination system 10 is (a) to seal all potential air paths in the work space as tightly as possible, (b) to provide a filtered exhaust system which removes only enough air from the sealed, isolated work space to establish a lower pressure and to offset any air leakage, and (c) to provide additional engineering controls to lower airborne fiber content within the work space. The engineering controls include a suitable number of HEPA filter devices 16, the capacity of which, combined with the capacity of device 14, are sufficient to cleanse the air internally of the work space 12 as many times an hour as may be desired or specified.

I claim:

1. In combination with a work space, which may be contaminated with airborne particles, such as asbestos particles, and which is maintained at subambient pressure, a decontamination system isolating the work space from an ambient space and comprising:

(a) an inner vestibule, which is connected to the work space via a first portal;

(b) a first door, which is mounted between the inner vestibule and the work space so as to enable the first portal to be selectively opened and closed by the first door, and which is adapted to allow small amounts of air to infiltrate from the inner vestibule, through the first door, and into the work space when the first portal is closed by the first door;

(c) a middle vestibule, which is connected to the inner vestibule via a second portal;

(d) a second door, which is mounted between the middle vestibule and the inner vestibule so as to enable the second portal to be selectively opened and closed by the second door, and which is adapted to allow small amounts of air to infiltrate from the middle vestibule, through the second door, and into the inner vestibule when the second portal is closed by the second door;

(e) at least one shower bath installed in the middle vestibule for use by personnel entering the middle vestibule from the inner vestibule;

(f) an outer vestibule, which is connected to the middle vestibule only via a third portal, and which is connected to the ambient space via a fourth portal;

(g) a third door, which is mounted between the outer vestibule and the middle vestibule so as to enable the third portal to be selectively opened and closed by the third door, and which is interconnected with the second door in such a manner that the second and third portals cannot be simultaneously opened, and which is adapted to seal the third portal against infiltration of air when the third portal is closed by the third door;

(h) a fourth door, which is mounted between the ambient space and the outer vestibule so as to enable the fourth portal to be selectively opened and closed by the fourth door, and which is adapted to allow small amounts of air to infiltrate from the ambient space, through the fourth door, and into the outer vestibule when the fourth portal is closed by the fourth door;

whereby personnel whose tools, and garments are contaminated can pass from the work space, through the first portal, and into the inner vestibule, in which they can leave their tools and garments, from the inner vestibule, through the second portal, and into the middle vestibule, in which they can use the shower bath, from the middle vestibule, through the third portal, and into the outer vestibule, in which they can put on clean garments, and from the outer vestibule, through the fourth portal, and into the ambient space, with minimal risk of escape of fugitive particles from the work space via the decontamination system.

2. The combination of claim 1 wherein each door is a rigid door.

3. The combination of claim 2 wherein, except for the third door, each door has fixed louvers allowing air to infiltrate through such louvers.

4. The combination of claim 1 wherein the work space contains at least one free-standing air-filtering device.

5. The combination of claim 4 wherein the work space contains at least two free-standing air-filtering devices.

* * * * *